United States Patent [19]

Lowe et al.

[11] Patent Number: 5,370,439
[45] Date of Patent: Dec. 6, 1994

[54] VEHICLE SEAT VENTILATION

[76] Inventors: Warren Lowe; George C. Lowe, both of 44 Hallberg Ave., Bergenfield, N.J. 07621

[21] Appl. No.: 177,135

[22] Filed: Jan. 4, 1994

[51] Int. Cl.$^5$ .................................................. A47C 7/74
[52] U.S. Cl. ............................. 297/180.11; 297/180.13
[58] Field of Search ...................... 297/180.11, 180.13, 297/180.1, 180.14

[56] References Cited

U.S. PATENT DOCUMENTS

| | | | |
|---|---|---|---|
| 2,791,956 | 5/1957 | Guest | 297/180.11 X |
| 2,912,832 | 11/1959 | Clark | 297/180.13 X |
| 3,137,523 | 6/1964 | Karner | 297/180.13 |
| 3,757,366 | 9/1973 | Sacher | 297/180.13 X |
| 4,002,108 | 1/1977 | Drori | 297/180.13 X |
| 4,413,857 | 11/1983 | Hayashi | 2197/180.13 X |
| 4,997,230 | 3/1991 | Spitalnick | 297/180.13 X |
| 5,016,302 | 5/1991 | Yu | 297/180.13 X |

Primary Examiner—Peter R. Brown
Attorney, Agent, or Firm—Terrance L. Siemens

[57] ABSTRACT

A two part ventilated seat cover for a motor vehicle seat, comprising a seat portion cushion and a seat back cushion. The two cushions are separated and mutually attached by a bulkhead. The bulkhead prevents air flow between the respective cushions. The cushions are equally sized to help equalize air flow thereto and therefrom. Elastic straps are provided to each cushion to facilitate attachment to the vehicle seat. Air is drawn into the system through an air pick up, then passes through a flexible conduit which branches into two secondary conduits. Each secondary conduit is preferably of equal cross section, each supplying one cushion with equal air flow. Each cushion is perforated only at a respective surface contacting the user, and air is discharged therethrough. Adequate supply of air to each respective cushion is assured by the branched supply conduit, and by separation of air flow within the respective cushions, as effected by the bulkhead. In alternative embodiments, air is obtained from the vehicle ventilation system and from a self-powered fan. In the latter case, the fan is integral to the air pick up.

8 Claims, 2 Drawing Sheets

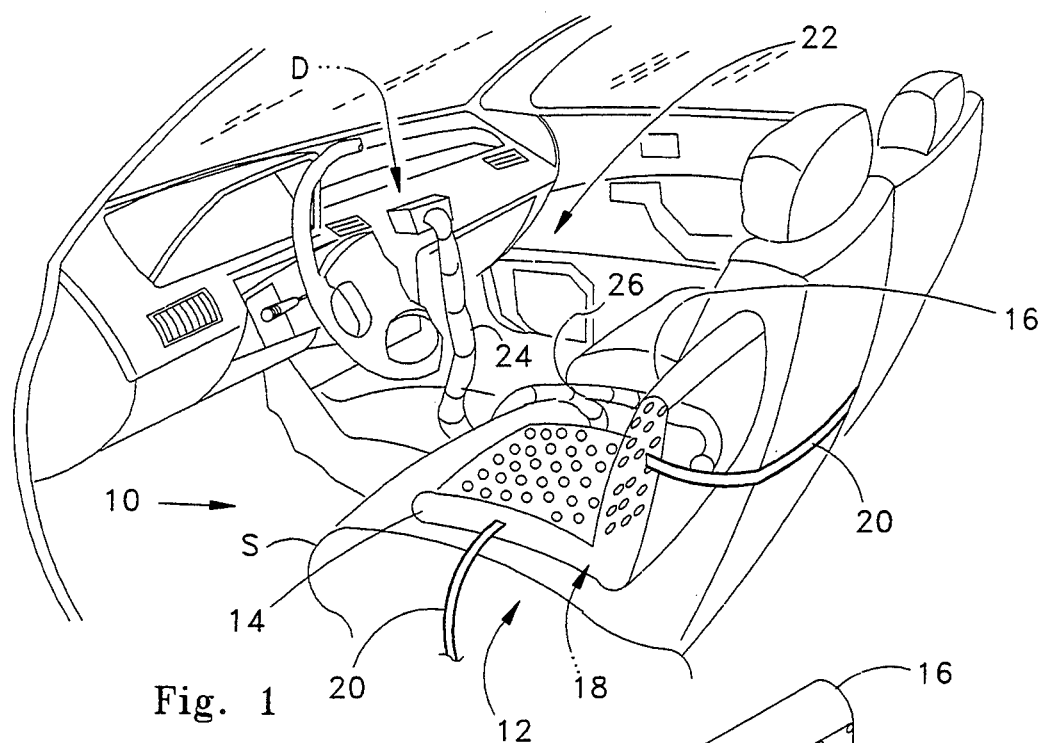
Fig. 1
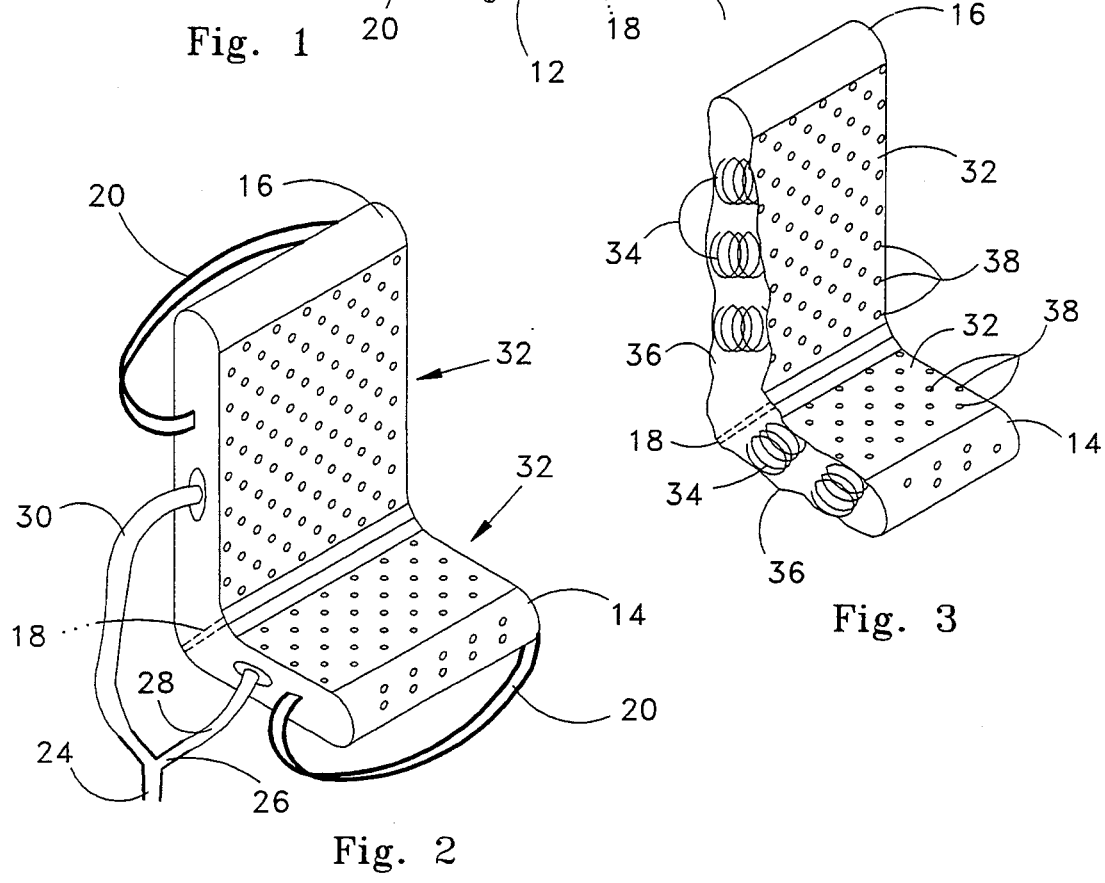
Fig. 2
Fig. 3

VEHICLE SEAT VENTILATION

BACKGROUND OF THE INVENTION

1. Field of the Invention

The present invention relates to apparatus for ventilating a vehicle seat. Generally, then, the field of the invention is vehicular transportation. Even more generally, the invention relates to the scientific field of compressible fluid flow.

2. Description of the Prior Art

The following known prior art has been directed to providing seat ventilation devices and techniques. As will be seen, the simplicity and effectiveness of my invention is not rivaled in the prior art.

Supplementary ventilation systems for vehicle seats are known in the prior art. U.S. Pat. No. 4,981,324, issued to Ignace K. Law on Jan. 1, 1991, is representative of ventilated seats which are placed on a vehicle seat. A conduit is connected to the vehicle ventilation system, and delivers heated or cooled air to the ventilated seat. The ventilated seat has orifices on its upper surfaces for releasing air to flow against a user's body. In an alternate embodiment, the Law invention is provided with an integral fan. In other alternate embodiments, the ventilated seat comprises a seat back only, or a seat and seat back in combination.

U.S. Pat. No. 4,997,230, issued to Samuel Spitalnick on Mar. 5, 1991, discloses a device employing the same general principles, although departing in specific construction. A single flexible air conduit deriving an air supply from the vehicle ventilation supply branches to deliver air from the flexible conduit through respective valves or controls to respective seat and seat back cushion segments.

U.S. Pat. Nos. 4,853,992, issued on Aug. 8, 1989, and 5,016,302, issued on May 21, 1991, both issued to Kaung H. Yu, disclose a ventilated seat device which lacks a seat back portion. Air is derived from the vehicle ventilation system.

U.S. Pat. No. 4,043,544, issued to Walter Ismer on Aug. 23, 1977, discloses a seat cushion or pad which is integral with a seat assembly, including ventilation directing air against a user's body. Air flow is generated by periodic compaction and expansion of the pad, which occurs in response to a user shifting his or her weight thereon.

None of the above inventions and patents, taken either singly or in combination, is seen to describe the instant invention as claimed.

SUMMARY OF THE INVENTION

The present invention provides a portable, divided, dual cushion assembly dispersing air against the body of a driver or passenger in a motor vehicle. The assembly includes a flexible conduit obtaining air under pressure for delivery through a branched portion extending to each of the dual cushions. Each cushion, one of which serves the buttocks and thighs, and the other of which serves the back, includes air impervious side and back or bottom panels, and a perforated body contacting panel. Springs space apart back or bottom panels from the body contacting panels, thus defining a plenum chamber therein. Retaining straps slip over the permanent vehicle seat back and seat bottom.

The cushion assembly is readily attached to and removed from the vehicle seat. The flexible conduit obtains air from the vehicle ventilation supply, so that controls for the inventive assembly are the same as those for the vehicle ventilation system. Equal flow assures that both the upper cushion for the back and the lower cushion for the buttocks and thighs will be sufficiently ventilated. This flow is provided by: firstly, dividing flow into two separate paths; and, secondly, separating the upper cushion from the lower cushion. Equally sized cushions enable equal air quantities to be discharged from the cushions.

In an alternative embodiment, a powered fan assembly picks up cabin air for circulation through the cushion assembly.

Accordingly, it is a principal object of the invention to provide a seat ventilation system which assures adequate air flow to all parts thereof, and which equally ventilates both the back and the seat area of the user.

It is still another object of the invention to equalize air flow to upper and lower cushions of a seat ventilation system.

It is again an object of the invention to provide a branched air supply conduit which delivers air equally to seat back and seat cushions.

A further object of the invention is to separate air delivered to upper and lower cushions of the seat ventilation system.

It is again an object of the invention to provide a seat ventilation system which attaches to a vehicle seat.

Yet another object of the invention is to provide equally sized seat cushions in a seat ventilation system.

It is another object of the invention to provide a seat ventilation system which derives its supply of air from the vehicle.

It is an additional object of the invention to provide a seat ventilation system which draws an air supply from and is readily attachable to an existing vehicle ventilation system.

Another object of the invention is to provide an air supply system which provides air pressure independently of the vehicle ventilation system.

Finally, it is a general goal of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

The present invention meets or exceeds all the above objects and goals. Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 1 is an environmental, diagrammatic, perspective view of a first embodiment of the invention.

FIG. 2 is a perspective detail view of a seat cushion assembly of the present invention.

FIG. 3 is a perspective detail view of the seat cushion assembly of FIG. 2, broken away to reveal internal detail.

DETAILED DESCRIPTION OF A PREFERRED EMBODIMENT

Figure 4:
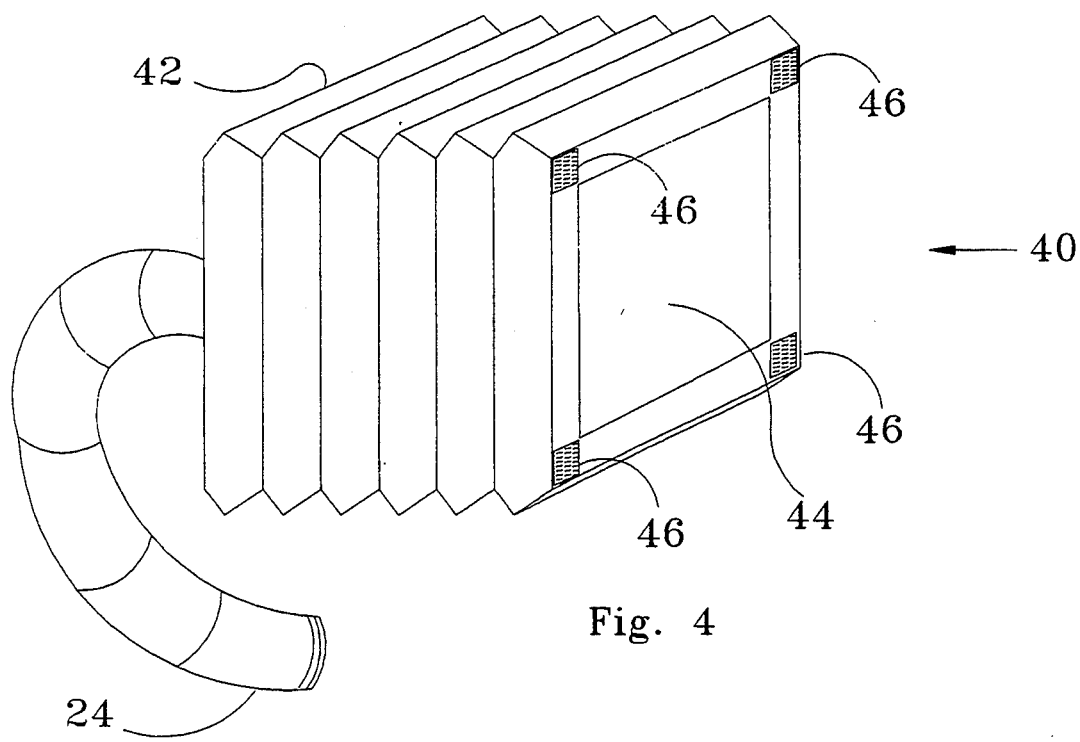
FIG. 4 is a perspective detail view of a first embodiment of an air pickup member drawn to enlarged scale.

With reference to FIG. 1 of the drawings, the invention 10 is seen installed on a driver's seat S in a motor vehicle. A two part seat assembly 12 including separate, equally sized seat and seat back cushions 14,16, which are both compartmented with respect to air flow, and mutually attached by a bulkhead 18. An elastic band 20 is attached to each respective cushion 14 or 16 for attachment to vehicle seat S.

Air is provided by an air supply system 22 which, in a first embodiment, is connected to an air diffuser D of the existing vehicle ventilation system. The air supply system 22 includes an air pickup member and a flexible primary conduit 24 conducting air to seat assembly 12.

Connection of the air supply system 22 to respective seat cushions 14,16 is more clearly seen in FIG. 2. Primary conduit 24 splits at a Y fitting 26, feeding two secondary conduits 28,30. Each secondary conduit 28 or 30 discharges air to one of the seat and seat back cushions 14,16.

Cushions 14,16 are seen to include perforated body contacting panels 32, other panels being air impervious. Bulkhead 18 is clearly seen in this view.

Turning now to FIG. 3, cushions 14 and 16 are seen to include springs 34 biased to space apart a body contacting panel 32 from an opposite panel 36. In addition to increasing passenger comfort by providing a resilient surface, springs 34 also maintain depth of respective cushions 14 and 16, thereby providing a plenum chamber within each cushion 14 or 16. Air thus is able to flow readily throughout each cushion 14 or 16, and is evenly distributed to perforations 38.

Air pickup member 40 is seen in a first embodiment illustrated in FIG. 4 to comprise a collapsible, bellows type box 42 having an open end 44 and hook and loop patches 46 for adhering to corresponding patches (not shown), which are placed on vehicle air diffuser D (see FIG. 1). Box 42 is placed over air diffuser D, and the vehicle ventilation system provides conditioned air to seat cushions 14,16.

Figure 5:
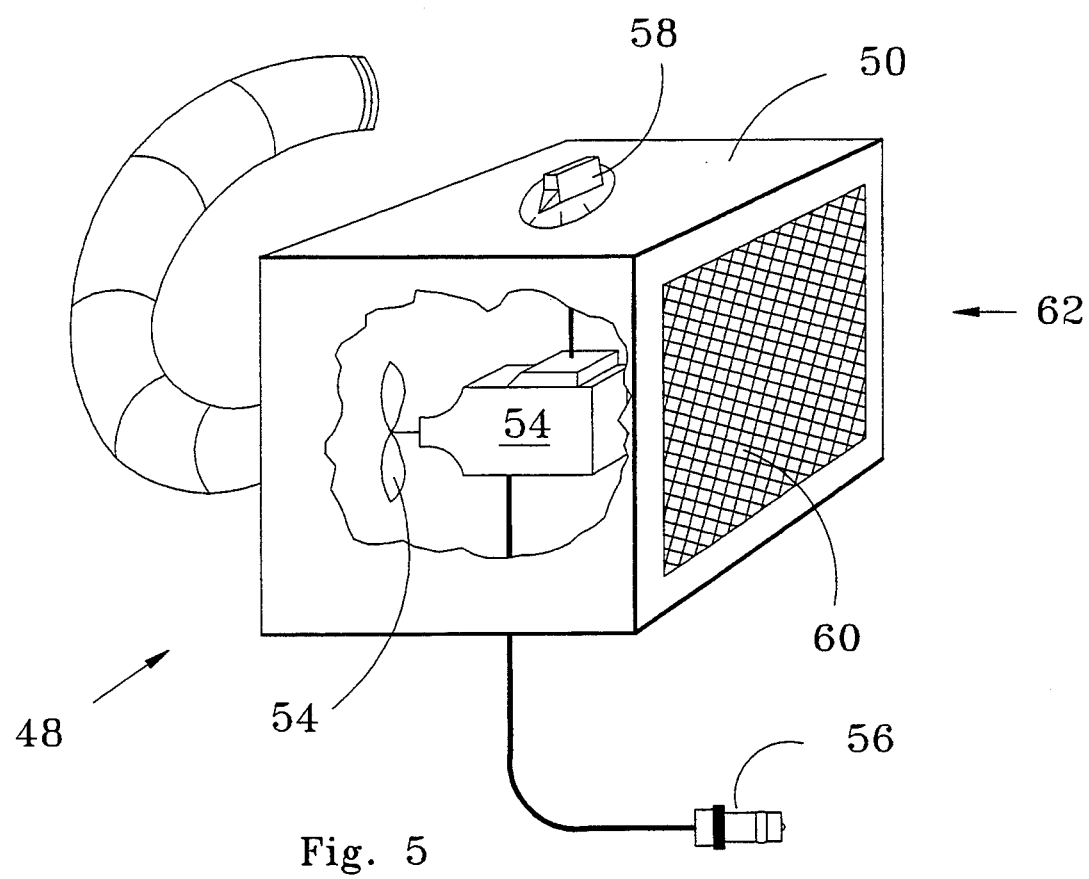
FIG. 5 is a perspective detail view of a second embodiment of an air pickup member, drawn to enlarged scale.

In a second embodiment, shown in FIG. 5, air pickup member 48 comprises a box 50 having a fan 52 and an electric motor 54. A power cord 56 arranged to pick up power from the vehicle cigarette lighter is connected to motor 54, and a knob control 58 incorporating both a knob and a switch is provided on box 50 to switch motor 54 on and off. A screen 60 covers an open end 62, so as to enable passage of air therethrough, but preventing small objects and dust from entering.

Thus, it will be seen that a practical seat ventilation system 10 for a vehicle is provided. The system 10 cooperates readily with a vehicle in attachment to a seat S and connection to air supply. It also provides the versatility to leave the vehicle ventilation system unencumbered by obstructing a diffuser D, in the embodiment employing a powered fan 52.

Obviously, the provided illustrative example is by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions. For example, the artisan could easily see that a diverter valve could be utilized to selectively direct air to the seat of the back portion in accordance with the user's wishes.

It is to be understood that the present invention is not limited to the sole embodiment described above, but encompasses any and all embodiments within the scope of the following claims:

We claim:

1. A seat ventilation system for ventilating the back and seat body portions of an occupant, comprising;
    equally sized, separate seat and seat back cushions having perforated body contacting panels and air impervious side and back panels forming plenum chambers, each of said seat and seat back cushions including manual, removable attachment means for attachment to the vehicle seat and a common impervious wall between said plenum chambers of said seat and seat back cushions, preventing air flow therebetween; and
    an air supply system comprising a single, flexible, primary air conduit having proximal and distal ends, a Y manifold attached to said proximal end, and two elongated flexible secondary conduits, each one of said secondary conduits attached to said Y manifold and also to one of said seat and seat back cushions at a point in one of said side panels nearest the center of the respective plenum chamber so as to deliver air volume substantially equally to each respective plenum Chamber, and an air pickup member attached to said distal end.

2. The seat ventilation system according to claim 1, said attachment means comprising elastic bands.

3. The seat ventilation system according to claim 1, said cushions having springs therein, disposed to separate a respective said body contacting panel from an opposite panel.

4. The seat ventilation system according to claim 1, said air pickup member comprising a collector attached to said primary conduit distal end, said collector having means for attachment to a vehicle air diffuser.

5. The seat ventilation system according to claim 1, said air pickup member comprising an enclosed, powered fan.

6. The scat ventilation system according to claim 1, said secondary conduits being of substantially equal cross section.

7. A seat ventilation system for ventilating the back and seat body portions of an occupant, comprising;
    equally sized, separate seat and scat back cushions having perforated body contacting panels and air impervious side and back panels forming plenum chambers and springs therein, disposed to separate a respective said body contacting panel from said back panel, each of said seat and seat back cushions including elastic bands for attachment to the vehicle seat and a common impervious wall between said plenum chambers of said seat and scat back cushions, preventing air How therebetween; and an air supply system comprising a single, flexible, primary air conduit having proximal and distal ends, a Y manifold attached to said proximal end, and two elongated flexible secondary conduits, each one of said secondary conduits attached to said Y manifold and also to one of said seat and seat back cushions at a point in one of said sidepanels nearest the center of the respective plenum chamber so as to deliver air volume substantially equally to each respective plenum chamber, and an air pickup member attached to said distal end, comprising an enclosed, powered fan.

8. The seal ventilation system according to claim 7, said secondary conduits being of substantially: equal cross section.

* * * * *